(12) United States Patent
Ramos (10) Patent No.: US 11,906,882 B2
(45) Date of Patent: Feb. 20, 2024

(54) SYSTEMS AND METHODS FOR MOUNTING CAMERAS

(71) Applicant: Belgravia Wood Limited, Hong Kong (HK)

(72) Inventor: Jaime Ramos, Moorpark, CA (US)

(73) Assignee: Belgravia Wood Limited, Central (HK)

(*) Notice: Subject to any disclaimer, the term of this patent is extended or adjusted under 35 U.S.C. 154(b) by 0 days.

(21) Appl. No.: 17/445,794

(22) Filed: Aug. 24, 2021

(65) Prior Publication Data

US 2022/0057696 A1    Feb. 24, 2022

Related U.S. Application Data

(60) Provisional application No. 62/706,541, filed on Aug. 24, 2020.

(51) Int. Cl.
*G03B 17/56* (2021.01)
*G03B 17/08* (2021.01)

(52) U.S. Cl.
CPC ......... *G03B 17/561* (2013.01); *G03B 17/08* (2013.01)

(58) Field of Classification Search
CPC ....... G03B 17/561; G03B 17/08; G02B 23/22
See application file for complete search history.

(56) References Cited

U.S. PATENT DOCUMENTS

| | | | | |
|---|---|---|---|---|
| 3,162,107 A | * | 12/1964 | Byers | G03B 17/08 396/375 |
| 8,781,312 B1 | * | 7/2014 | deSouza, Jr. | G03B 17/08 396/27 |
| 2005/0260903 A1 | * | 11/2005 | Batt | B63B 32/66 441/79 |
| 2009/0004936 A1 | * | 1/2009 | Mollis | B63B 32/59 441/66 |
| 2012/0315813 A1 | * | 12/2012 | Rossini | B63B 22/00 441/75 |
| 2013/0235226 A1 | * | 9/2013 | Karn | H04N 23/661 348/220.1 |
| 2014/0267743 A1 | * | 9/2014 | Tapia | G03B 17/08 348/157 |
| 2015/0107055 A1 | * | 4/2015 | Anari | F16M 13/00 16/422 |
| 2016/0266473 A1 | * | 9/2016 | Knight | G03B 17/08 |
| 2018/0201354 A1 | * | 7/2018 | Marchio | B63H 25/42 |

FOREIGN PATENT DOCUMENTS

WO   WO-2020031216 A1 * 2/2020

* cited by examiner

*Primary Examiner* — Christopher E Mahoney
(74) *Attorney, Agent, or Firm* — Finnegan, Henderson, Farabow, Garrett & Dunner LLP (57) ABSTRACT

Embodiments of the present disclosure provide systems and methods for camera mounts. A camera mount may be capable of floating in liquid. A camera mount may include a base mounted to an inflatable; a floating mount, wherein the floating mount is configured to be attachable to a camera; and a pivotable connection that connects the base to the floating mount. The pivotable connection may be configured to float. A camera mount may include a mount or connection for mounting to an inflatable.

17 Claims, 14 Drawing Sheets

SYSTEMS AND METHODS FOR MOUNTING CAMERAS

FIELD

The present disclosure relates generally to camera mount systems, including apparatus, systems, and methods for installing a camera mount.

BACKGROUND

An inflatable is used for recreation by supporting a portion of the weight of an occupant, typically in a body of water such as a pool, lake, ocean, or river. The inflatable may be a foam or air-filled polymer flotation device. Some inflatables support several occupants. Other inflatables may be used for pulling behind a boat or passing over rapids of a river.

It may be desirable to use a camera in such circumstances. However, a secure attachment is critical to ensure the camera is not separated from the inflatable due to a high chance of sinking, being lost, or otherwise damaged. It is further desirable to mount a camera above an inflatable so that the camera can capture a wide field of view. It is further desirable that a camera be mounted to a flotation system in the case detachment occurs so that the camera may be recovered.

SUMMARY

An exemplary aspect of this disclosure relates to a camera mount comprising an inflatable; a base mounted to the inflatable; a floating mount that floats on water, wherein the floating mount is configured to be attachable to a camera; and a pivotable connection that connects the base to the floating mount. According to some aspects, the pivotable connection may comprise a flexible portion. According to some aspects, the pivotable connection may be configured to float. According to some aspects, the pivotable connection may be configured to slide onto a mount of the base and clip to the base. According to some aspects, the pivotable connection may comprise a foam material. According to some aspects, the floating mount may comprise an air enclosure.

An exemplary aspect of this disclosure relates to a camera mount comprising an inflatable; a base mounted to the inflatable via a welded connection; and a pivotable connection that connects the base to the floating mount.

An exemplary aspect of this disclosure relates to a camera mount comprising a base configured to be mounted to a handle; and a mount configured to float in water, wherein the mount comprises a pocket, wherein the pocket is configured to hold a camera; and a pivotable connection that connects the base to the mount.

An exemplary aspect of this disclosure relates to a camera mount comprising a lower frame comprising a threaded attachment; and an upper frame comprising a foam or an enclosed air pocket, wherein the upper frame and the lower frame form a sealed pocket, wherein the sealed pocket is configured to hold a camera. According to some aspects, the lower frame may open to allow access to the sealed pocket. According to some aspects, the lower frame comprising a hinge to allow access to the sealed pocket. According to some aspects, the camera mount may comprise a base that is attachable to the lower frame, wherein the base is configured to clamp to the handle. According to some aspects, the base may be configured to contain a portion the handle within the base. According to some aspects, the sealed pocket may comprise a transparent material. According to some aspects, the sealed pocket may be airtight.

It is to be understood that both the foregoing general description and the following detailed description are exemplary and explanatory only and are not restrictive of the invention. The accompanying drawings, which are incorporated in and constitute a part of this specification, illustrate several exemplary embodiments and together with the description, serve to outline principles of the exemplary embodiments.

It is to be understood that both the foregoing general description and the following detailed description are exemplary and explanatory only and are not restrictive of the scope of the invention.

DETAILED DESCRIPTION

Reference will now be made in detail to exemplary embodiments, some examples of which are shown in the accompanying drawings.

Exemplary disclosed embodiments include apparatus, systems, and methods for a camera mount. For example, in some embodiments, a camera mount may be incorporated into an inflatable. The inflatable may include a polymer and/or foam that floats on water. The camera mount may be securely attached to the inflatable to prevent undesired detachment of the camera and/or sinking of the camera in the water. The camera may be a mobile device capable of communicating, viewing video or images, playing music, recording video, or recording images. The camera may be a point-of-view camera. The camera mount may be securely incorporated into the inflatable to provide the occupant the ability to use the camera while using or taking advantage of the inflatable. It is contemplated that the camera may be replaced by another electronic device such as a music player or screen.

FIGS. 1, 2A-2B, 3A-3D, 4A-4B, 5A-5D, 6A-6B, 7A-7B, 8A-8E, 9A-9B, and 10 illustrate non-limiting examples of an inflatable consistent with the present disclosure. It is understood that the examples and embodiments described represent simplified descriptions used to facilitate understanding of the principles and methods of this disclosure.

Figure 1:
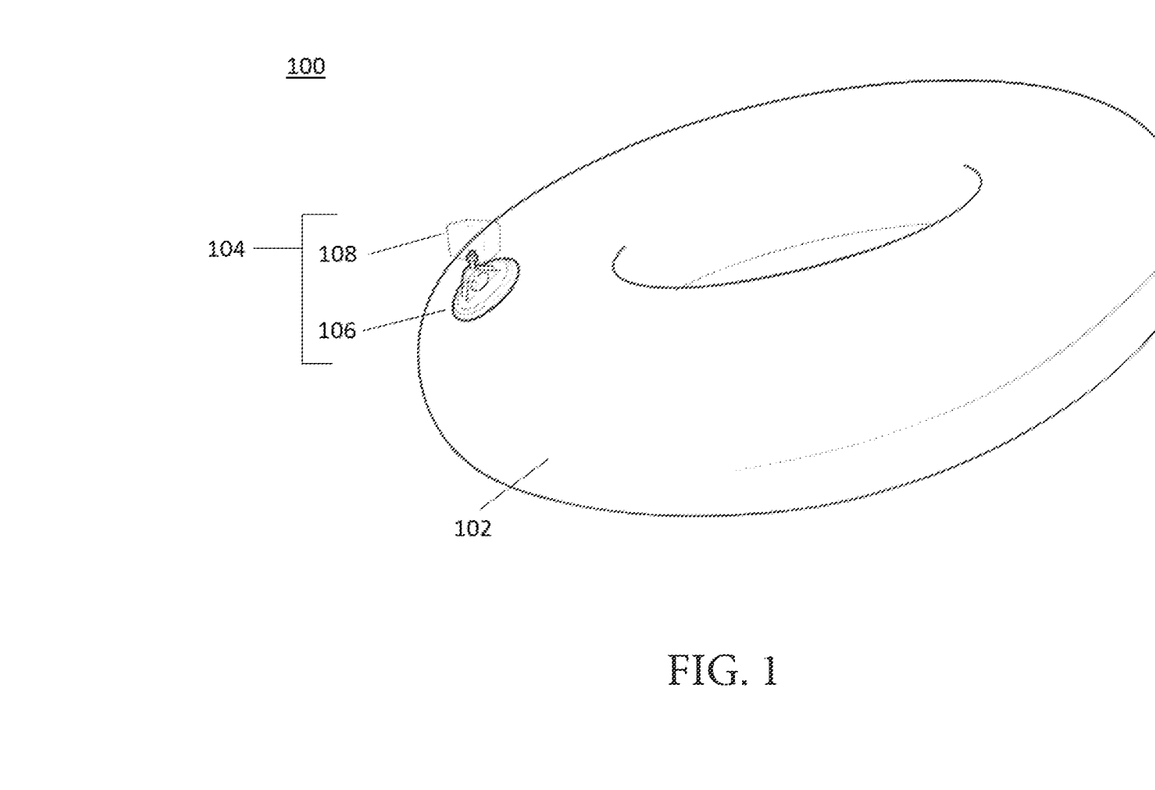
FIG. 1 illustrates an exemplary embodiment of a camera mount system.

FIG. 1 shows an exemplary embodiment of inflatable 100. In some embodiments, inflatable 100 may include a surface 102. Surface 102 may be a polymer that surrounds air or foam for the purpose of floating on a body of water. Surface 102 may be shaped like a donut to allow an occupant to rest on surface 102. Although a donut-shape is contemplated, it is contemplated that surface 102 may take the form of a number of different shapes, for example, to support an occupant's weight on a body of water, or, as another example, to support convenience or recreational items on a body of water.

Inflatable 100 may include a camera mount 104. Inflatable 100 may include a polymer and/or a foam. Camera mount 104 may include a mounting base 106. Mounting base 106 may include a polymer. Mounting base 106 may be attached to surface 102 via an adhesive and/or welded connection. The adhesive and/or welded connection may be partially or substantially on top of surface 102 and/or within surface 102. Those of skill in the art will appreciate that a number of attachment methods could be used to permanently or semi-permanently attach camera mount 104 to surface 102.

Camera mount 104 may include floating mount 108. Camera mount 104 may include a polymer. Floating mount 108 may be mounted on base 106 via a pinned, threaded, adhesive, or welded connection. Base 106 may comprise a universal threaded connection so that it may be mounted to a number of camera mounts discussed herein. The universal threaded connection may be a common size such as a quarter inch or similar to fit a number of different cameras and/or camera cases. Floating mount 108 may include a foam or an air enclosure such that the weight of an attached camera may be supported in a body of water. It is contemplated that floating mount 108 may be a polymer enclosure for a camera. It is contemplated that a camera may be mounted to base 106 without an intermediary mount (e.g., floating mount 108).

Figure 2A:
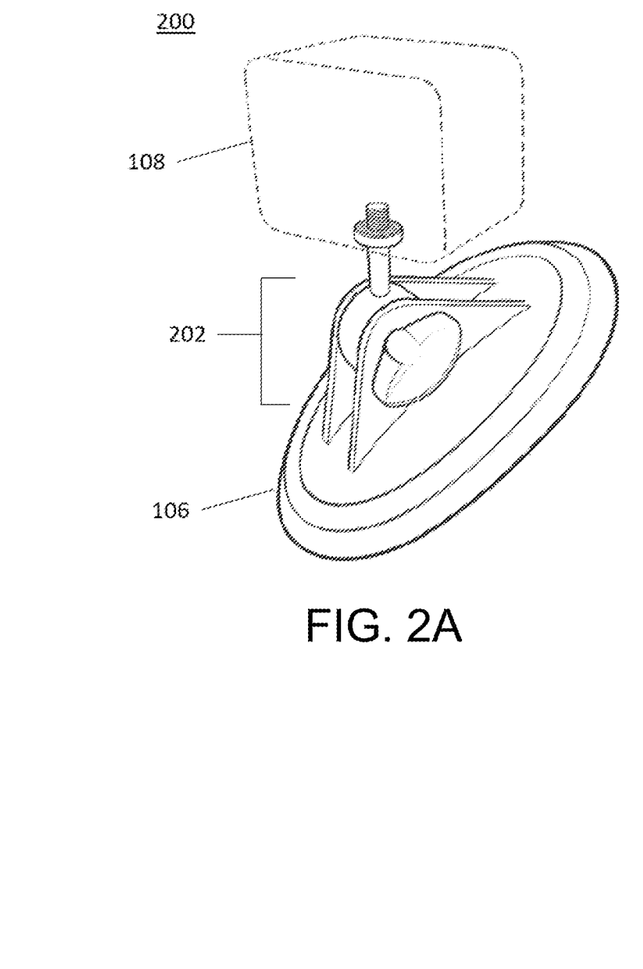
FIGS. 2A-2B illustrate exemplary embodiments of a camera mount.
Figure 2B:
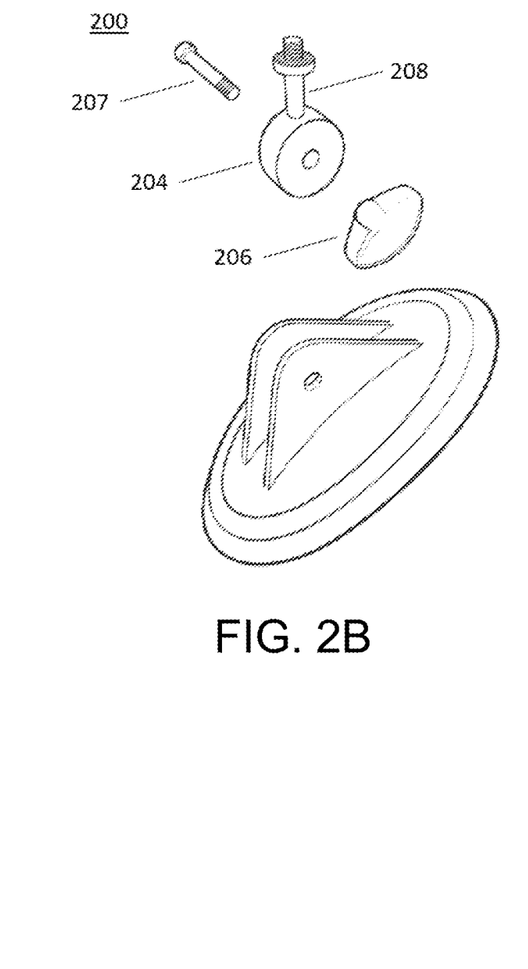

FIGS. 2A-2B illustrate exemplary embodiments of a camera mount 200. Camera mount 200 may include a base (e.g., base 106) and a floating mount (e.g., floating mount 108). Camera mount 200 may include a dynamic connection 202 to connect the base to the floating mount. Dynamic connection 202 may pivot around an axis or a point to allow floating mount 108 to change to a desired orientation relative to an occupant or user of an inflatable. Dynamic connection 202 may include a threaded or pinned connection. Dynamic connection 202 may include rotatable portion 204 that rotates around an axis of a pin. In some embodiments, dynamic connection 202 may include a spherical portion that rotates about a point. The dynamic connection 202 may be substantially locked in one orientation by threaded portions 206, 207. In some embodiments, dynamic connection 202 may include protrusion portion 208 configured to be connected to the dynamic portion of the mount (e.g., rotatable portion 204). Protrusion portion 208 may be an extrusion or may be attached via a pinned, threaded, press fit, welded, or adhesive connection. Floating mount 108 may be connected to protrusion portion 208 via a pinned, threaded, welded, or adhesive connection. Floating mount 108 may include features to attach a camera.

It is contemplated that some embodiments may include a sealable cover and/or enclosure attached to a floating mount (e.g., floating mount 108) that prevents a device from directly contacting water. In such instances, the sealable cover and/or enclosure may be a film and/or a polymer with a seal. It is contemplated that floating mount 108 may include at least one of an elastic connection, a series of recesses and protrusions, a clip, or a cavity, to connect the camera to floating mount 108. It is contemplated that floating mount 108 may include a lanyard or elastic connection to the camera to ensure a connection between the camera and floating mount 108. It is contemplated that floating mount 108 may include an electrically or voice-actuated actuator that interacts with one or more buttons or interfaces of a camera.

Figure 3A:
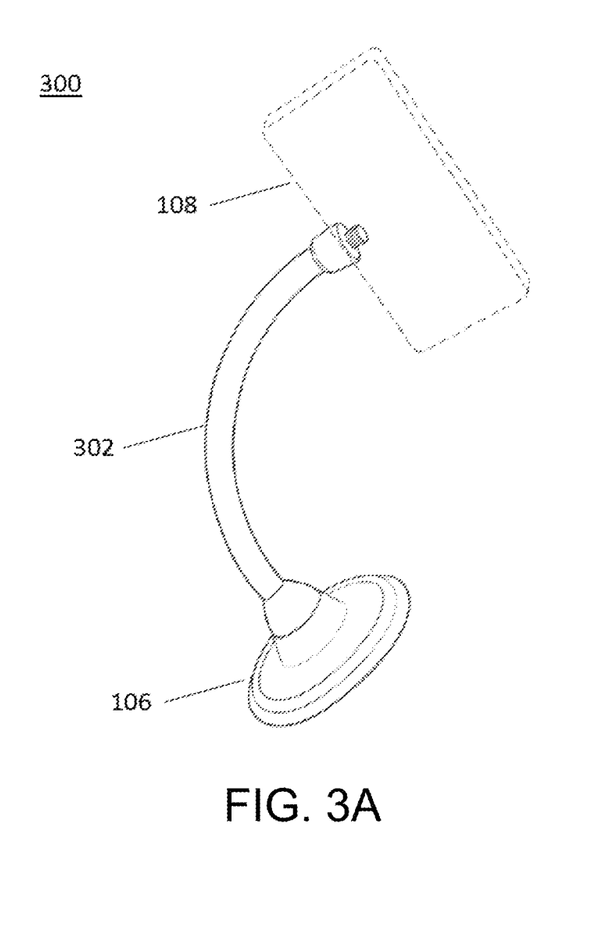
FIGS. 3A-3D illustrate exemplary embodiments of a camera mount.
Figure 3B:
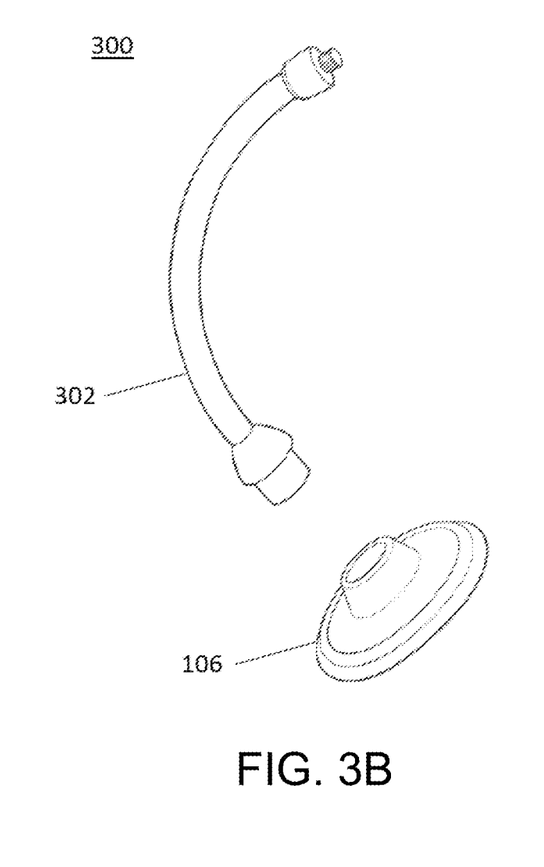

FIGS. 3A-3B illustrate exemplary embodiments of a camera mount 300. Camera mount 300 may include a base (e.g., base 106) and a floating mount (e.g., floating mount 108). Camera mount 300 may include a flexible portion 302 to connect the base to the floating mount. Flexible portion 302 may flexibly move to allow floating mount 108 to change to a desired orientation relative to an occupant or user of an inflatable. Flexible portion 302 may include a tube with an air pocket that floats on a body of water. Flexible portion 302 may include a foam that floats on a body of water. Flexible portion 302 may be configured to support a portion of the weight of flexible portion 302 and/or device connected to flexible portion 302 in water. Flexible portion 302 may be connected to base 106 via a press fit or adhesive connection. Floating mount 108 may be connected to flexible portion 302 via a press fit, pinned, threaded, welded, or adhesive connection.

Figure 3C:
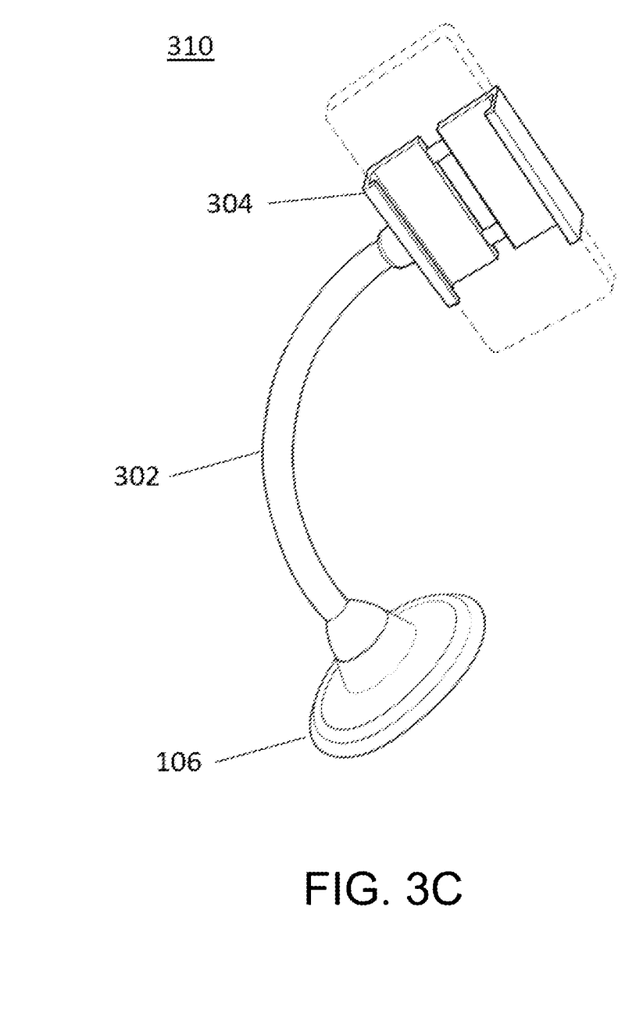
Figure 3D:
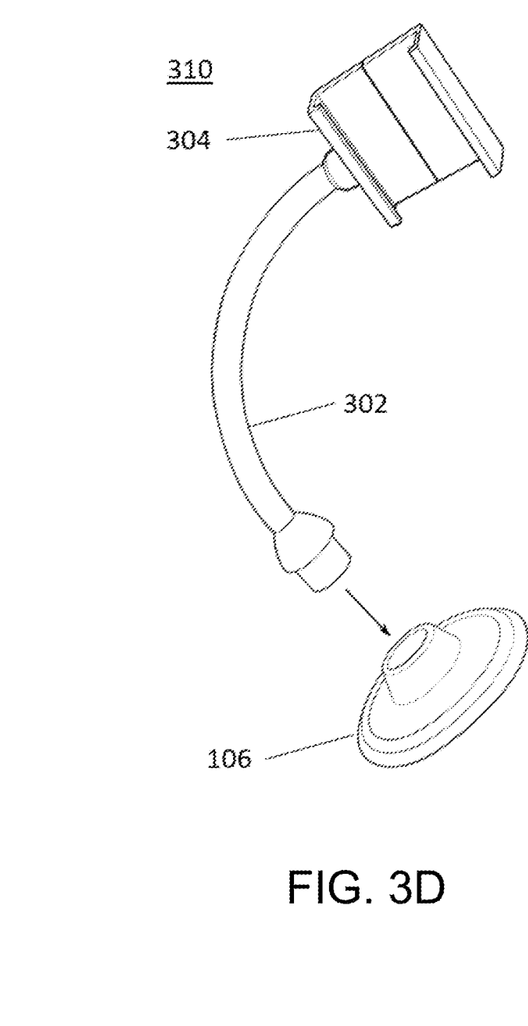

FIGS. 3C-3D illustrate exemplary embodiments of a camera mount 310. Certain features of camera mount 310 may be similar to those of exemplary camera mount 300 discussed above with respect to FIGS. 3A-3B. The following description of camera mount 310 describes certain features of camera mount 310 that may vary from those of camera mount 300. Camera mount 310 may include device mount 312. Two clamp portions of device mount 304 may be expandable to accommodate a camera of a longer width. Clamp portions may include recesses to entrap the camera. It is contemplated that device mount 304 could expand along a lengthwise direction to accommodate a camera of a longer length. It is contemplated that the circumference of an area between two clamp portions may expand to accommodate a camera of a larger circumference. The two clamp portions may be biased shut via a spring. The two clamp portions may be connected via a pin. It is contemplated that device mount 304 may include an elastic to hold a camera to the device mount 304.

Figure 4A:
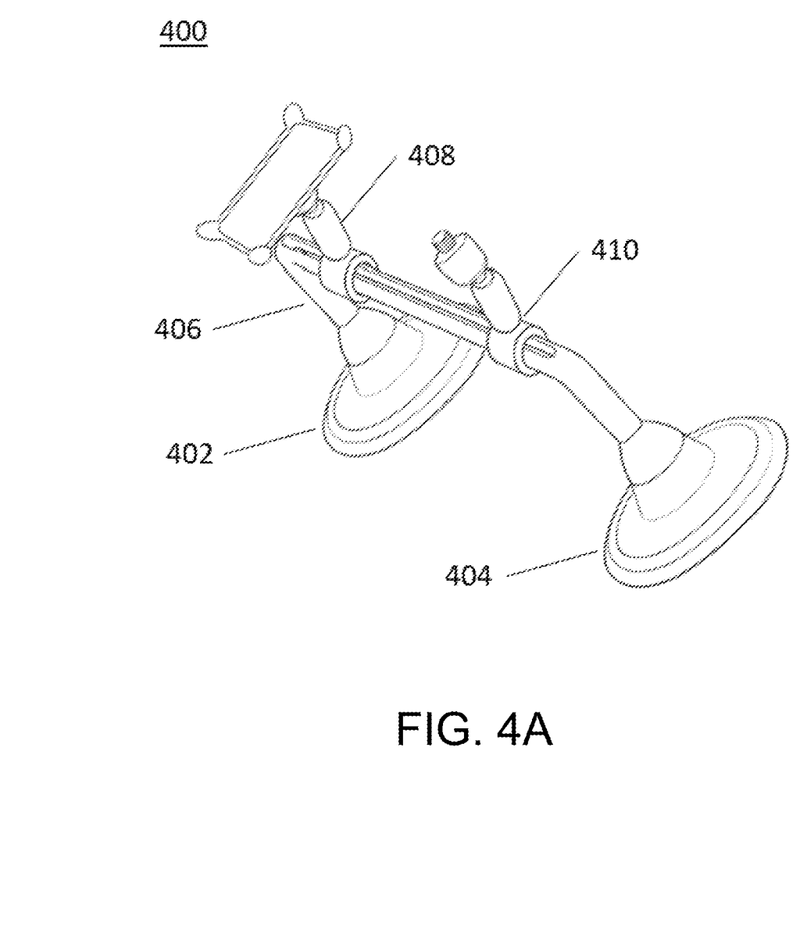
FIGS. 4A-4B illustrate exemplary embodiments of a camera mount.
Figure 4B:
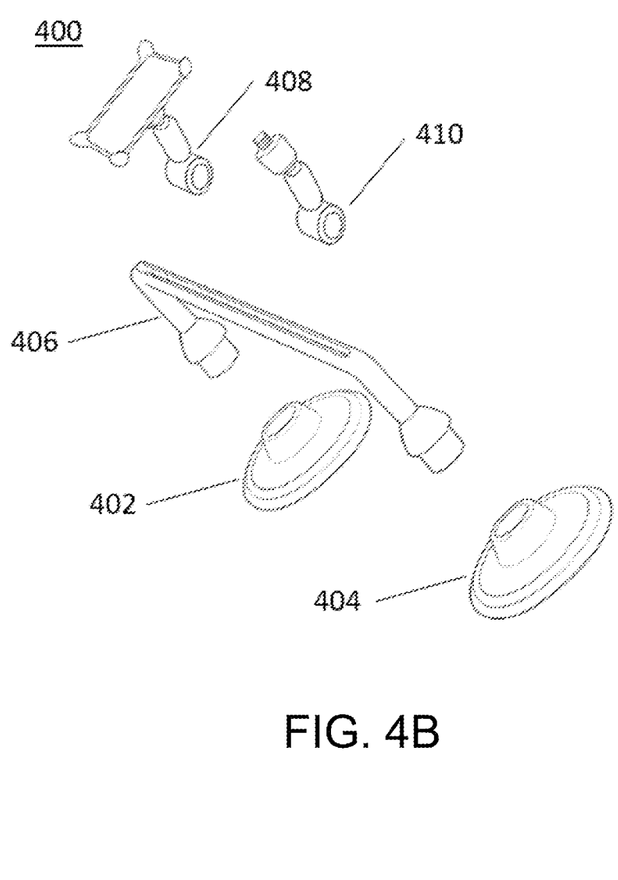

FIGS. 4A-4B illustrate exemplary embodiments of a camera mount 400. Camera mount 400 may include first base 402 and second base 404. First base 402 and second base 404 may be similar to base 106. Camera mount 400 may include a fixed link 406 that connects to first base 402 and second base 404. Fixed link 406 may connect to a base via a press fit, pinned, threaded, welded, or adhesive connection. Fixed link 406 may include an air pocket or a foam material such that fixed link 406 floats in a body of water. Camera mount 400 may include one or more attachment portions such as attachment portion 408, 410. Attachment portions 408, 410 may include a floating mount (e.g., floating mount 108) such that attachment portions 408, 410 float in a body of water. Attachment portions 408, 410 may include features to attach one or more cameras or devices. Each attachment portion may be used for a device or the attachment portions may be used jointly to support a single device. For example, the device may be a sound bar that spans across more than one attachment portions. Camera mount 1005 may comprise a universal threaded connection so that it may be mounted to a number of camera mounts discussed herein. The universal threaded connection may be a common size such as a quarter inch or similar to fit a number of different cameras and/or camera cases. Attachment portions 408, 410 may be connected to fixed link 406 to allow one or more devices to be oriented in a desired direction. Attachment portions 408, 410 may be connected to fixed link 406 via a connection that may be tightened to fix one or more device in a desired orientation.

Figure 5A:
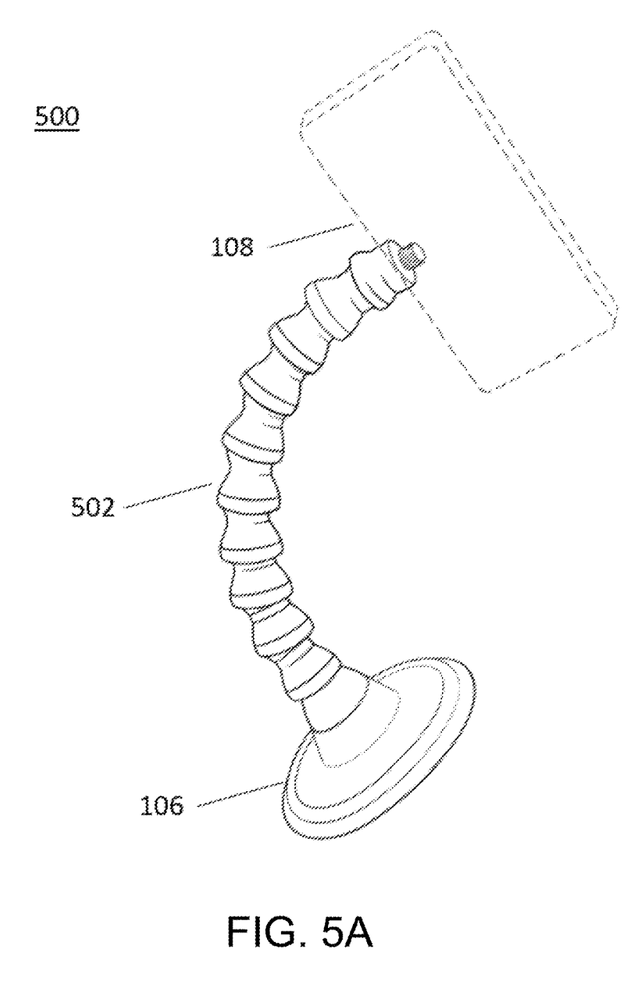
FIGS. 5A-5D illustrate exemplary embodiments of a camera mount.
Figure 5B:
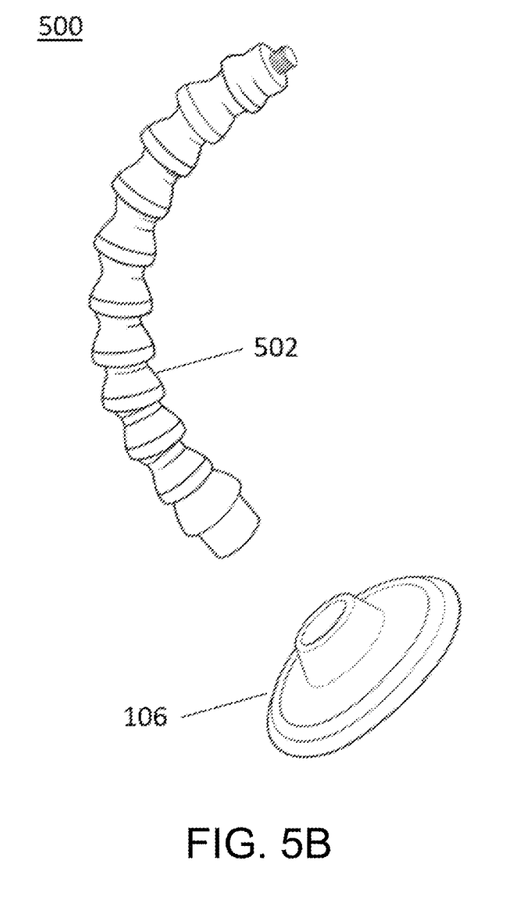

FIGS. 5A-5B illustrate exemplary embodiments of a camera mount 500. Camera mount 500 may include a base (e.g., base 106) and a floating mount (e.g., floating mount 108). Camera mount 500 may include an extendable portion 502 to connect the base to the floating mount. Extendable portion 502 may be flexible to allow a camera to be oriented in a desired direction. Extendable portion 502 may include adjustable links to allow a camera to be positioned closer to the base or further from the base. Extendable portion 502 may include a foam or an air pocket such that extendable portion 502 floats in a body of water.

Figure 5C:
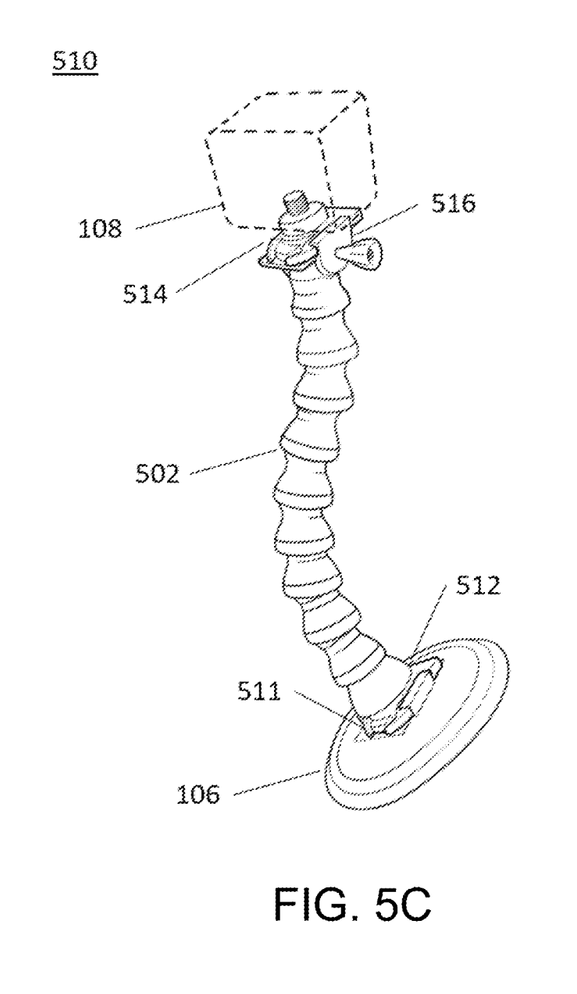
Figure 5D:
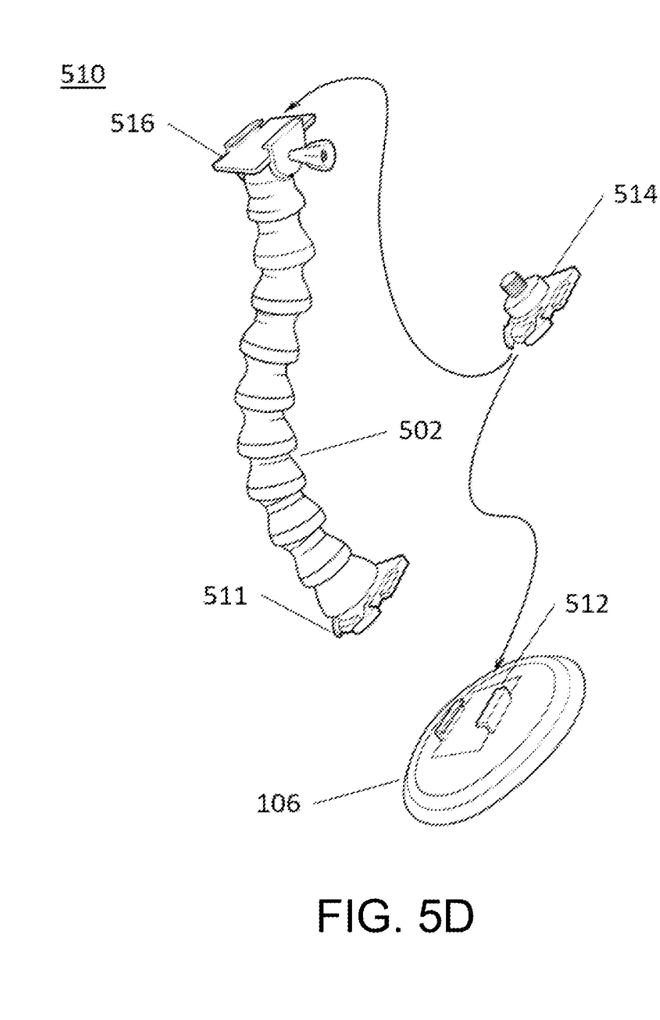

FIGS. 5C-5D illustrate exemplary embodiments of a camera mount 510. Certain features of camera mount 510 may be similar to those of exemplary camera mount 500 discussed above with respect to FIGS. 5A-5B. The following description of camera mount 510 describes certain features of camera mount 510 that may vary from those of camera mount 510. Camera mount 510 may include first slide mount 512 connected to base 106. Camera mount 510 may include first slide insert 511 connected to extendable portion 502. First slide insert 511 may connect to first slide mount 512. Camera mount 510 may include second slide mount 516 connected to extendable portion 502. Camera mount 510 may include second slide insert 514 connected to floating mount 108. Second slide insert 514 may be configured to be connectable to first slide mount 512. It is contemplated that an insert and a slide may be exchangeable on certain components such as extendable portion 502 and base 106.

Figure 6A:
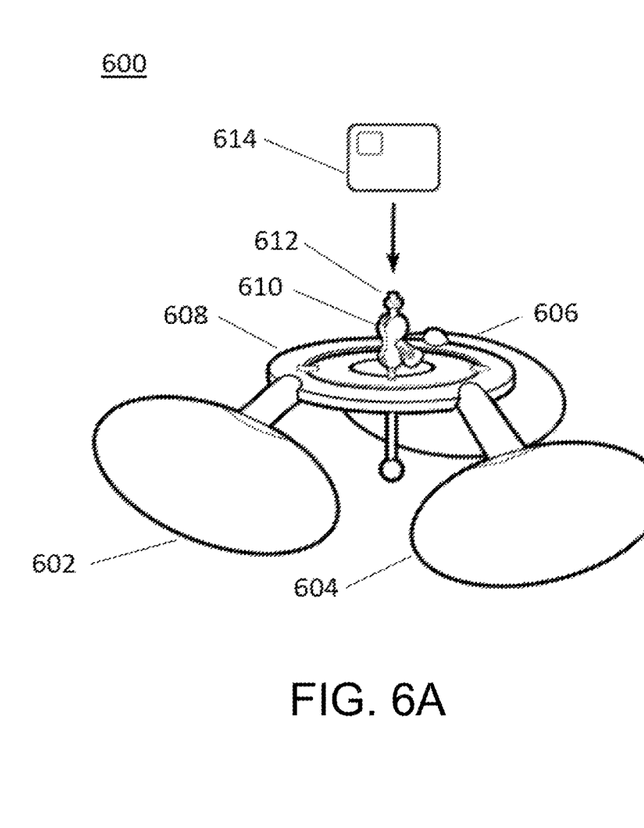
FIGS. 6A-6B illustrate exemplary embodiments of a camera mount.

FIG. 6A illustrates an exemplary embodiment of a camera mount 600. Camera mount 600 may include a first base 602, a second base 604, and a third base 606. Each base may be similar to base 106 described above. Each base may be mounted to a portion of an inflatable. Bases 602, 604, and 606 may be connected to center mount 608. Center mount 608 may include one or more rotational portions. Camera mount 600 may include dynamic connection 610. Dynamic connection 610 may be similar to other dynamic connections disclosed herein (e.g., dynamic connection 202). Dynamic connection 610 may be connected to one or more rotational portions of center mount 608. Dynamic connection 610 may allow the camera to remain axially and rotationally stable relative to bases 602, 604, and 606. Center mount 608 may include foam or a blow mold that floats and/or support a portion of the weight of a device in a body of water.

Figure 6B:
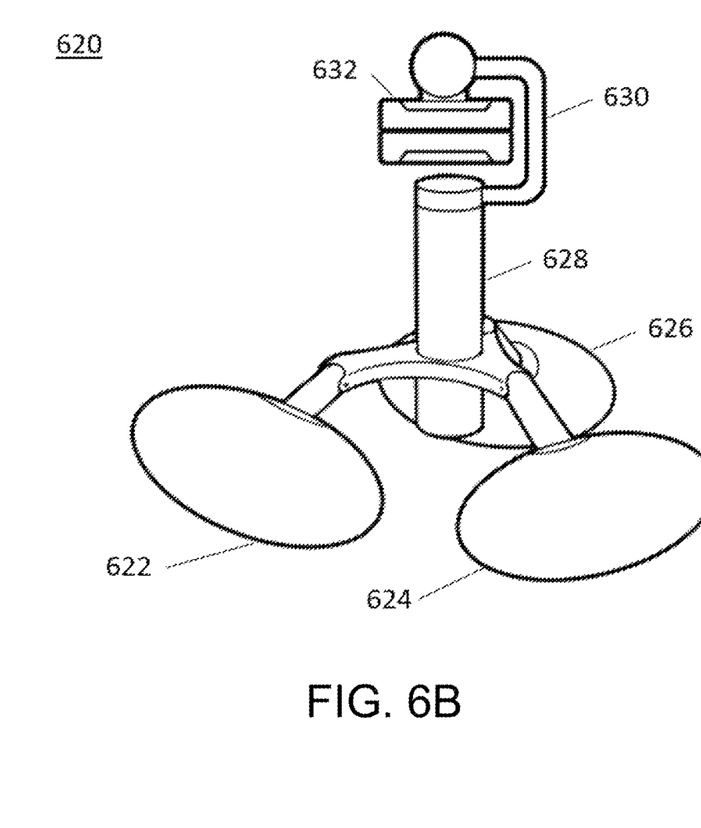

FIG. 6B illustrates an exemplary embodiment of a camera mount 620. Camera mount 620 may include a first base 622, a second base 624, and a third base 626. Each base may be similar to base 106 described above. Each base may be mounted to a portion of an inflatable. Bases 622, 624, and 626 may be pivotally connected to center mount 628. The pivot connection may be a hinge that allows up and down movement of center mount 628. The pivot connection may be a hinge that allows rotational movement of center mount 628. In some embodiments, the pivot connection may allow spherical rotation of center mount 628 relative to one or more of bases 622, 624, and 626. Center mount 628 may be a battery operated gimbal. The battery operated gimbal may include an inertia measuring unit that measures a movement of the device. The battery operated gimbal may include a motor that operates a gyro to resist a change in motion to a camera. Center mount 628 may include hanging mount 630. Center mount 628 may include device mount 632. Hanging mount 630 may be configured to hold device mount 632 from a connection above device mount 632. Device mount 632 may be similar to other device mounts disclosed herein (e.g., device mount 312, floating mount 108). Center mount 628 may allow a device held by device mount 632 to remain axially and/or rotationally stable relative to bases 622, 624, and 626. Center mount 628 may include a foam or an air pocket that floats and/or support a portion of the weight of a camera in a body of water.

Figure 7A:
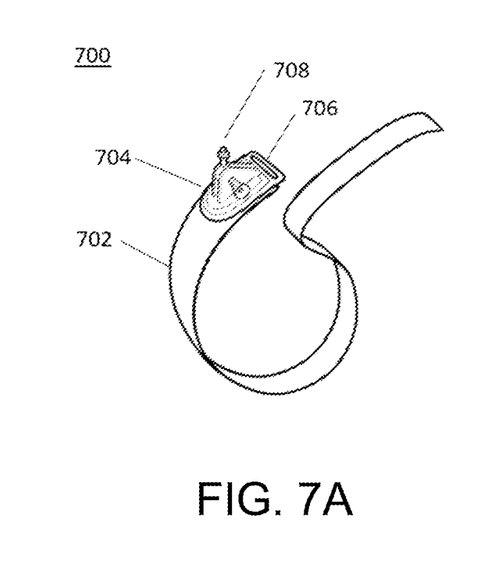
FIGS. 7A-7B illustrate exemplary embodiments of a camera mount.
Figure 7B:
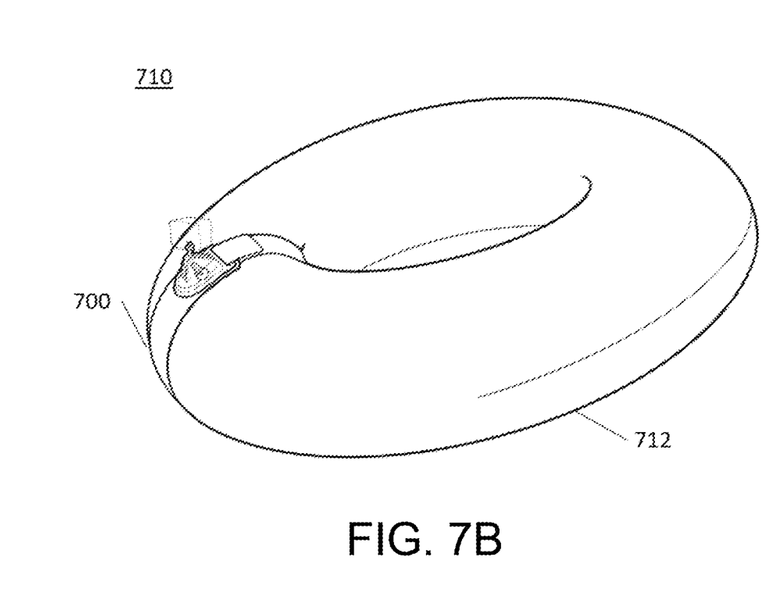

FIGS. 7A-7B illustrate exemplary embodiments of a camera mount 700. Camera mount 700 may include strap 702. Strap 702 may be configured to attach to a portion of an inflatable, such as inflatable 712. Strap 702 may include buckle 704. Camera mount 700 may include loop 706. Strap 702 may extend around a portion of an inflatable and through loop 706. Strap 702 may be connected to itself or to an anchor after passing through loop 706. Strap 702 may include provisions for attaching to itself or an anchor via a connection such as a tie, hook and loop, and/or adhesive connection. Buckle 706 may be attached to dynamic connection 708. Dynamic connection 708 may be similar to other dynamic connections disclosed herein (e.g., dynamic connection 202). Rotatable portion 708 may extend from buckle 706 to attach to a device mount, such as device mounts disclosed herein (e.g., floating mount 108). Rotation portion 708 may include a lock to fix rotatable portion 708 at an angle relative to buckle 706. The lock may include a threaded or pinned connection to lock rotatable portion 708 at an angle relative to buckle 706. Strap 702 may include a foam or an air pocket such that strap 702 floats in a body of water. FIG. 7B illustrates an exemplary embodiment of strap mounting system 710. Strap mounting system 710 may include camera mount 700 and inflatable 712. Camera mount 700 may be configured to wrap around a portion of inflatable 712. It is contemplated that camera mount 700 may be affixed to one or more handles of an inflatable.

Figure 8A:
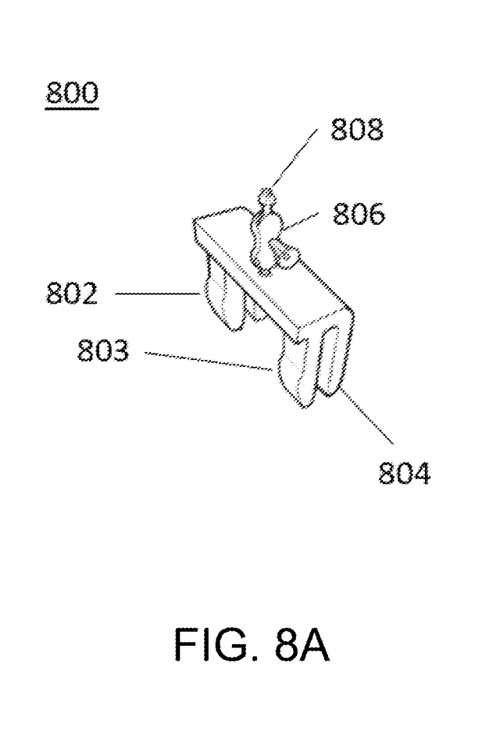
FIG. 8A illustrate an exemplary embodiment of a camera mount.
Figure 8B:
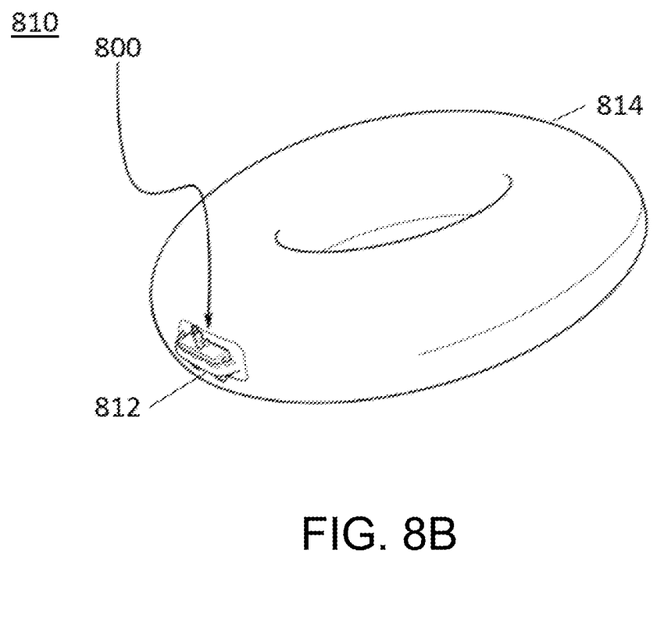
FIGS. 8B-8C illustrate exemplary embodiments of a camera mount system.

FIGS. 8A-8B illustrate exemplary embodiments of a camera mount 800. Camera mount 800 may include base 802. Base 802 may comprise a universal threaded connection so that it may be mounted to a number of camera mounts discussed herein. The universal threaded connection may be a common size such as a quarter inch or similar to fit a number of different cameras and/or camera cases.

Camera mount 800 may be configured to attach to a portion of an inflatable, such as inflatable 814. Inflatable 814 may include handle 812. Camera mount 800 may include fingers 802, 803. Camera mount 800 may include back 804. Fingers 802, 803 may be flexible. Fingers 802, 803 may bend relative to back 804. Fingers 802, 803 may include protrusions at the end of fingers 802, 803 to hold camera mount 800 to handle 812. The protrusions of fingers 802, 803 may expand after camera mount 800 has been inserted onto a handle. Camera mount 800 may include rotatable portion 806. Dynamic connection 806 may be similar to other rotatable portions disclosed herein (e.g., dynamic connection 708, dynamic connection 202). FIG. 8B illustrates an exemplary embodiment of insert mounting system 810. Insert mounting system 810 may include camera mount 800 and inflatable 814. Inflatable 814 may include handle 812. Camera mount 800 may be configured to fit within handle 812. It is contemplated that camera mount 800 may fit around a portion of handle 812. It is contemplated that camera mount 800 may be used as a wedge to mount between two generally opposing surfaces.

Figure 8C:
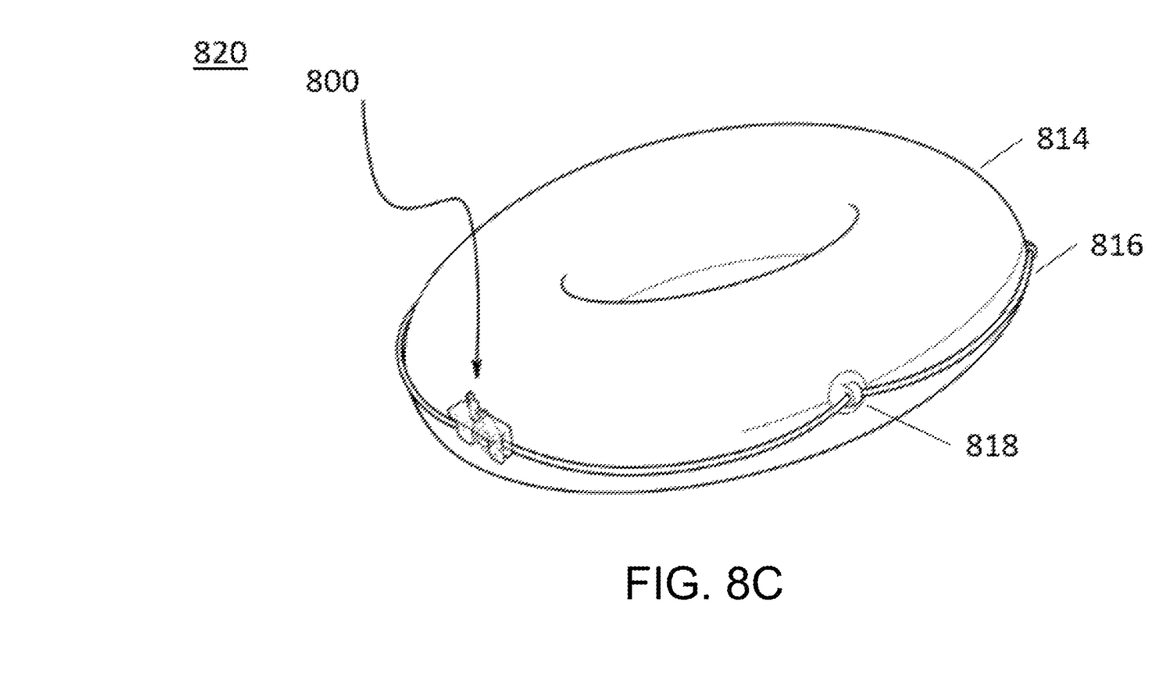

FIG. 8C illustrates an exemplary embodiment of insert mounting system 820. Insert mounting system 820 may include camera mount 800, inflatable 814, cord 816, and cord mount 818. Cord 816 may be mounted around a portion of inflatable 814. Cord 816 may be passed through an aperture of cord mount 818. Insert 800 may be attachable to cord 816.

Figure 8D:
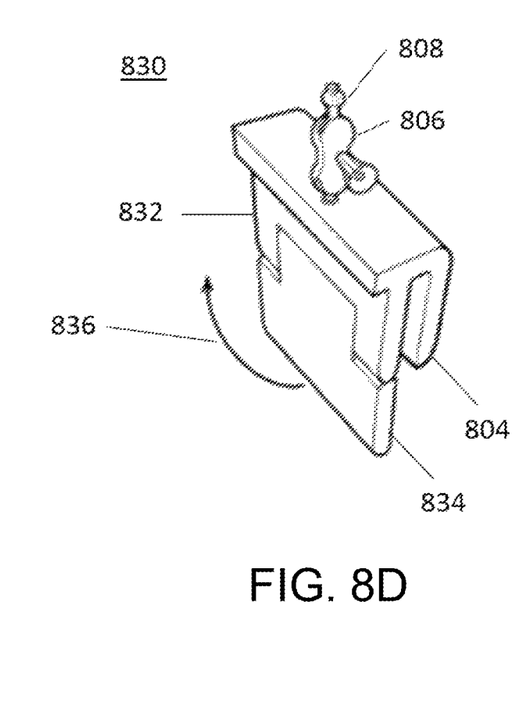
FIGS. 8D-8E illustrate exemplary embodiments of a camera mount.
Figure 8E:
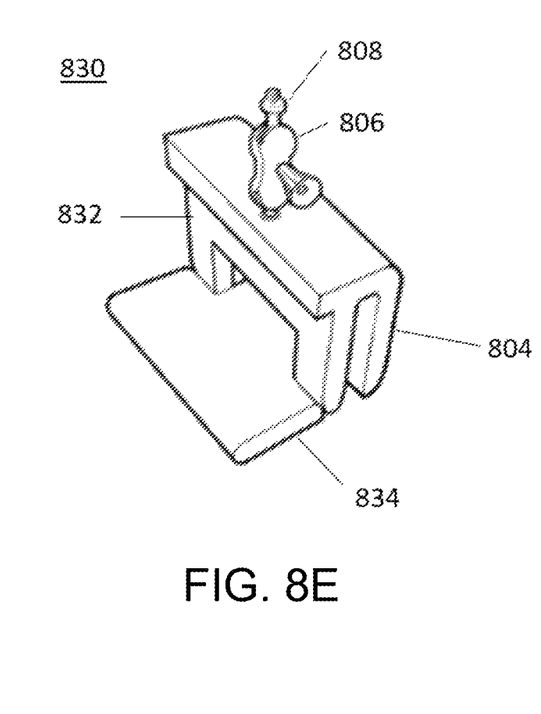

FIGS. 8D-8E illustrate exemplary embodiments of a camera mount 830. Certain features of camera mount 830 may be similar to those of exemplary camera mount 800 discussed above with respect to FIG. 8A. The following description of camera mount 830 describes certain features of camera mount 830 that may vary from those of camera mount 800. Camera mount 830 may include front segment 832. Front segment 832 may connect to lock segment 834. Lock segment 834 may pivot relative to front segment 832. Lock segment 834 may rotate between an insert position and a lock position. After insertion into a handle or aperture of an inflatable, lock segment 834 may rotate in a direction indicated by direction 836. A locking mechanism may fix an angle of lock segment 834 via a pinned connection, a mechanical stop, an actuator, a clip, or friction.

Figure 9A:
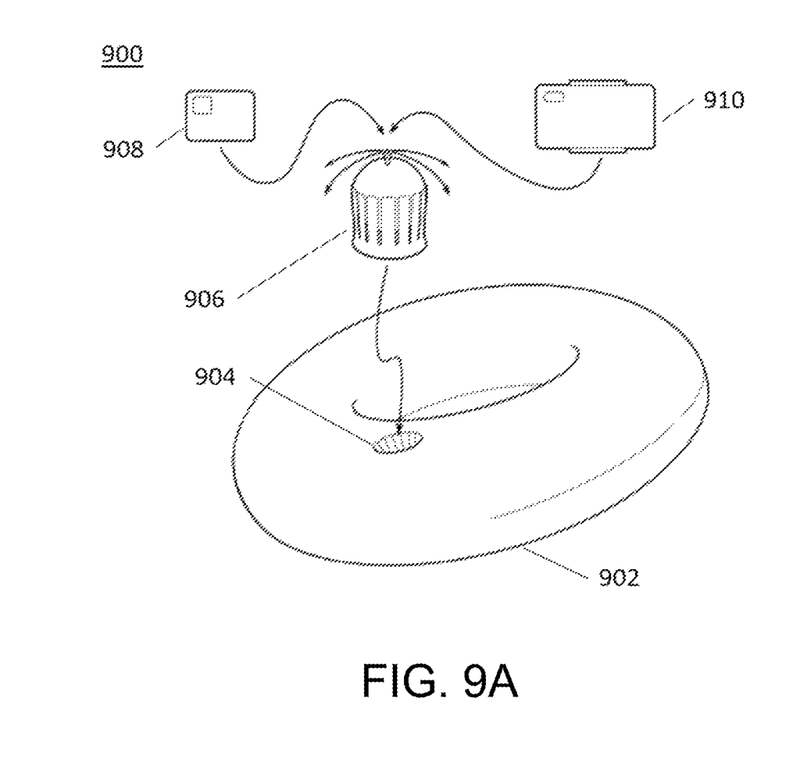
FIGS. 9A-9B illustrate an exemplary embodiment of a camera mount system.
Figure 9B:
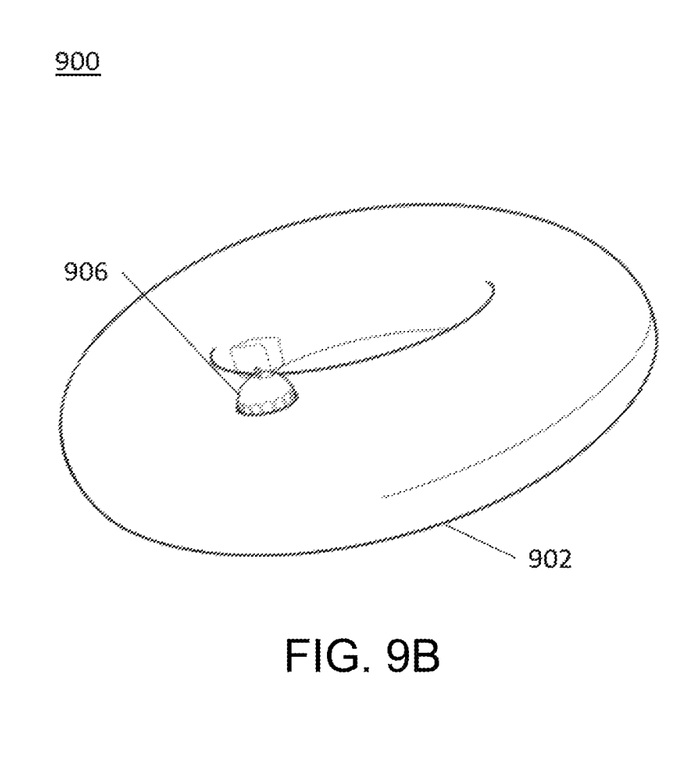

FIGS. 9A-9B illustrate exemplary embodiments of a camera mount 900. Camera mount system 900 may include inflatable 902. Inflatable 902 may include pocket 904. Pocket 904 may be a cupholder. In some embodiments, pocket 904 may be a recess portion. Camera mount system 900 may include cup insert 906. Cup insert 906 may include ridges that hold cup insert 906 in place against pocket 904. Cup insert 906 may include a ball and a socket. The socket may be attached to pocket 904. The ball may be configured to rotate in the socket. A lock may be provided to fix the ball in position relative to the socket. In some embodiments, portions of cup insert 906 may expand to press against an inside of pocket 904. Cup insert 906 may be configured to attach to camera 908. Cup insert 906 may be configured to attach to device mount 910. Device mount 910 may be similar to other device mounts disclosed herein.

Figure 10:
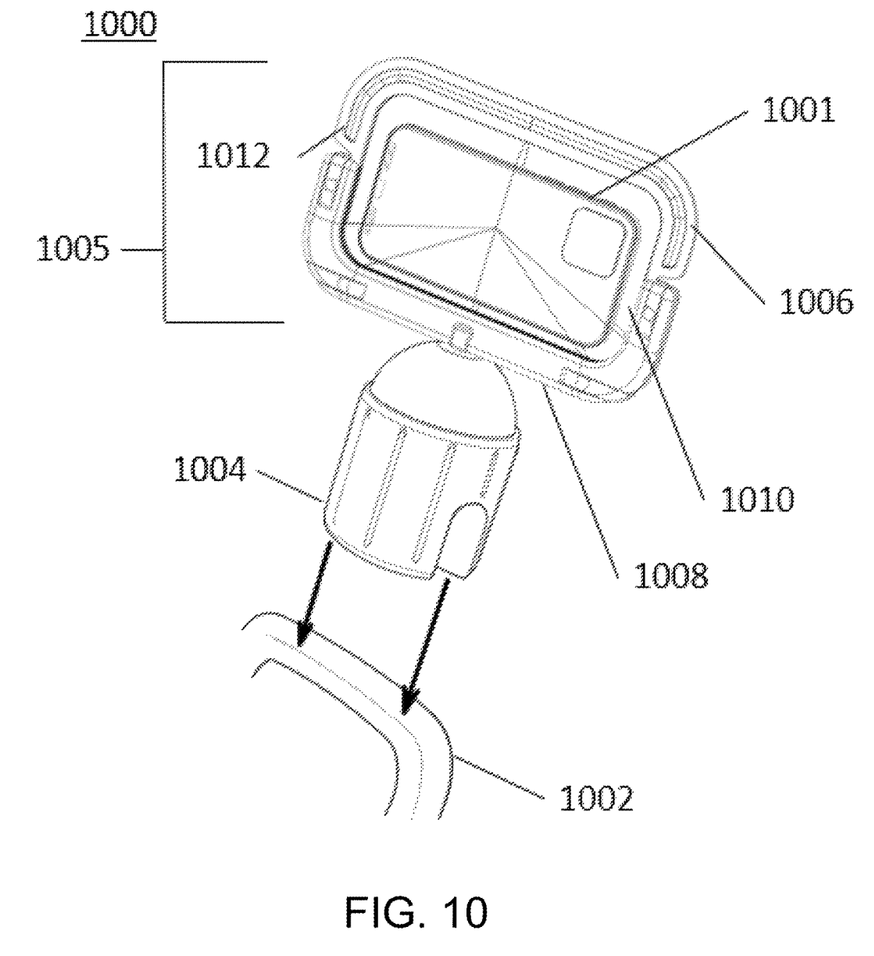
FIG. 10 illustrates an exemplary embodiment of a camera mount system.

FIG. 10 illustrates an exemplary embodiment of a camera mount assembly. Camera mount assembly 1000 may include handle 1002, base 1004, and camera mount 1005. Handle 1002 may include a handle of an inflatable. Base 1004 may include a threaded attachment configured to attach to camera mount 1005. Base 1004 may comprise a c-shape attachment configured to attach to handle 1002. The c-shape attachment may be fastened to handle 1002 by a friction fit or a press fit. In some embodiments, the c-shape attachment may comprise a receptacle to receive a corresponding snap protrusion of handle 1002. In some embodiments, the c-shape attachment may be configured to be tightened to handle 1002 through a threaded attachment. In some embodiments, base 1004 may attach to a handle as discussed above with respect to FIGS. 8A-8E. In some embodiments, base 1004 may attach to a handle via a first base attachment and a second base attachment, wherein the first base attachment and the second base attachment lock to each other around a handle via a clasp, a clip, a threaded attachment, a press fit, and/or another type of attachment discussed herein.

Camera mount 1005 may be configured to attach to base 1004 via a threaded attachment. Camera mount 1005 may comprise a universal threaded connection so that it may be mounted to a number of bases, pivotable connections, or attachments discussed herein. The universal threaded connection may be a common size such as a quarter inch or similar to fit a number of different cameras and/or camera cases. Camera mount 1005 may comprise upper frame 1006, lower frame 1008, and pocket 1010. Upper frame 1006 may comprise flotation material 1012. In some embodiments, lower frame 1008 may comprise flotation material 1012. Upper frame 1006 may be configured to move relative to lower frame 1008 to allow access to pocket 1010. In some embodiments, upper frame 1006 may be removable from lower frame 1008 to allow access to pocket 1010.

Upper frame 1006 may be attached to lower frame 1008 via a clasp, a clip, a threaded attachment, a hinge, a press fit, a weld, and/or another type of attachment discussed herein. In some embodiments, upper frame 1006 or lower frame 1008 may comprise one or more parts to be mated together using one or more of a hinge, a clip, an adhesive, a threaded connection, or another connection discussed herein. In some embodiments, the one or more parts of upper frame 1006 or lower frame 1008 may be separated to allow a camera to be placed within pocket 1010. In some embodiments, where a first part of lower frame 1008 and a second part of lower frame 1008 may be separated to allow a camera to be placed within pocket 1010, the first part and the second part may be connected and sealed so the two halves are waterproof. In some embodiments, where a first part of upper frame 1006 and a second part of upper frame 1006 may be separated to allow a camera to be placed within pocket 1010, the first part and the second part may be connected and sealed so the two halves are waterproof. In some embodiments, parts of upper frame 1006 or lower frame 1008 may be sealed to each other using one or more of a plastic barrier, a snap, a threaded connection, a press fit, or another connection discussed herein.

Pocket 1010 may be configured to contain camera 1006 in a waterproof space. Pocket 1010 may comprise one or more sheets of a transparent material to contain camera 1006. Pocket 1010 may comprise a water-resistant material configured to prevent water accumulation. Pocket 1010 may be welded to one or more of upper frame 1006 and/or lower frame 1008. In some embodiments, pocket 1010 may comprise a zipper, a seal, and/or a pressed barrier to allow access to camera 1006 and provide a waterproof space for camera 1006. Pocket 1010 may be configured to provide a waterproof space with transparent barrier for camera 1006 during a water-based recreational activity to allow camera 1006 to operate without becoming wet. Pocket 1010 may be configured to be airtight. Pocket 1010 may be configured to hold air such that pocket 1010 provides buoyancy.

It is understood that while certain embodiments are discussed to facilitate understanding of various principles and aspects of this disclosure, the embodiments are not described in isolation and the descriptions are not necessarily mutually exclusive. Thus, it is contemplated and understood that described features of principles of any embodiment may be incorporated into other embodiments.

It will be apparent to those skilled in the art that various modifications and variations can be made to the disclosed camera mount, inflatables, and mount devices. While illustrative embodiments have been described herein, the scope of the invention includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit of the invention being indicated by the following claims and their full scope of equivalents.

What is claimed is:

1. A camera mount comprising:
   a base mounted to an inflatable;
   a floating mount that floats, wherein the floating mount is attachable to a camera and contains the camera; and
   a pivotable connection that connects the base to the floating mount, wherein the pivotable connection is configured to support the camera in a mounted position, wherein the pivotable connection is configured to move to orient the camera in a determined direction, and wherein the pivotable connection is configured to float.

2. A camera mount of claim 1, wherein together, the pivotable connection, the floating mount, and the camera, have a buoyancy to float.

3. A camera mount of claim 1, wherein the pivotable connection is configured to slide onto a mount of the base and clip to the base.

4. A camera mount of claim 1, the floating mount comprises a foam material.

5. A camera mount comprising:
   a base mounted to an inflatable via a welded connection; and
   a pivotable connection configured to connect to the base, wherein the pivotable connection is configured to float, wherein the pivotable connection is configured to support a camera in a mounted position, and wherein the pivotable connection is configured to move to orient the camera in a determined direction.

6. A camera mount of claim 5, wherein the pivotable connection is configured to slide onto a mount of the base and clip to the base.

7. A camera mount of claim 5, further comprising a floating mount attaching the base to the pivotable connection, the floating mount comprises a foam material.

8. A camera mount of claim 5, wherein the pivotable connection comprises a threaded portion to mount to the camera or a camera case containing the camera.

9. A camera mount of claim 5, further comprising a fixed link, wherein the base comprises a first mounting portion and a second mounting portion, wherein the fixed links connects the first mounting portion to the second mounting portion, and wherein the pivotable connection connects to the fixed link.

10. A camera mount of claim 5, wherein the pivotable connection connects to a gimbal or hanging mount, wherein the camera is mounted on the gimbal or hanging mount.

11. A camera mount of claim 5, wherein the pivotable connection is connected to an expandable mount, wherein the expandable mount is configured to open to hold a phone.

12. A camera mount of claim 11, wherein the expandable mount is biased shut.

13. A camera mount of claim 5, the pivotable connection is connected to a slide mount to mount a camera.

14. A camera mount of claim 5, wherein together, the pivotable connection and the camera, have a buoyancy to float.

15. A camera mount of claim 5, wherein a camera mount assembly containing the camera comprises a waterproof pocket configured to provide buoyancy.

16. A camera mount of claim 5, wherein the pivotable connection connects to a camera mount assembly comprising an upper frame, a lower frame, and a waterproof pocket for a camera, wherein the upper frame is attachable and sealable to the lower frame to contain the camera in the waterproof pocket.

17. A camera mount of claim 16, wherein together, the pivotable connection, the camera mount assembly, and the camera, have a buoyancy to float.

\* \* \* \* \*